June 4, 1968 R. S. GRAHAM 3,387,232

PILOT-CONTROLLED REGULATING APPARATUS FOR TRANSMISSION SYSTEMS

Filed Aug. 3, 1965 2 Sheets-Sheet 1

INVENTOR
R. S. GRAHAM
BY Charles G. Call
ATTORNEY

June 4, 1968 R. S. GRAHAM 3,387,232

PILOT-CONTROLLED REGULATING APPARATUS FOR TRANSMISSION SYSTEMS

Filed Aug. 3, 1965 2 Sheets-Sheet 2

United States Patent Office 3,387,232
Patented June 4, 1968

3,387,232

PILOT-CONTROLLED REGULATING APPARATUS FOR TRANSMISSION SYSTEMS

Robert S. Graham, Boxford, Mass., assignor to Bell Telephone Laboratories, Incorporated, New York, N.Y., a corporation of New York Filed Aug. 3, 1965, Ser. No. 476,901
5 Claims. (Cl. 333—15)

ABSTRACT OF THE DISCLOSURE

Loss deviations in a transmission channel section between two regulated amplifiers are equalized by providing half the gain connection at the transmitting end and half at the receiving end. The gain connection at the transmitting and receiving ends is controlled by a pilot signal whose level is determined by the attenuation in the transmission channel.

Figure 1:
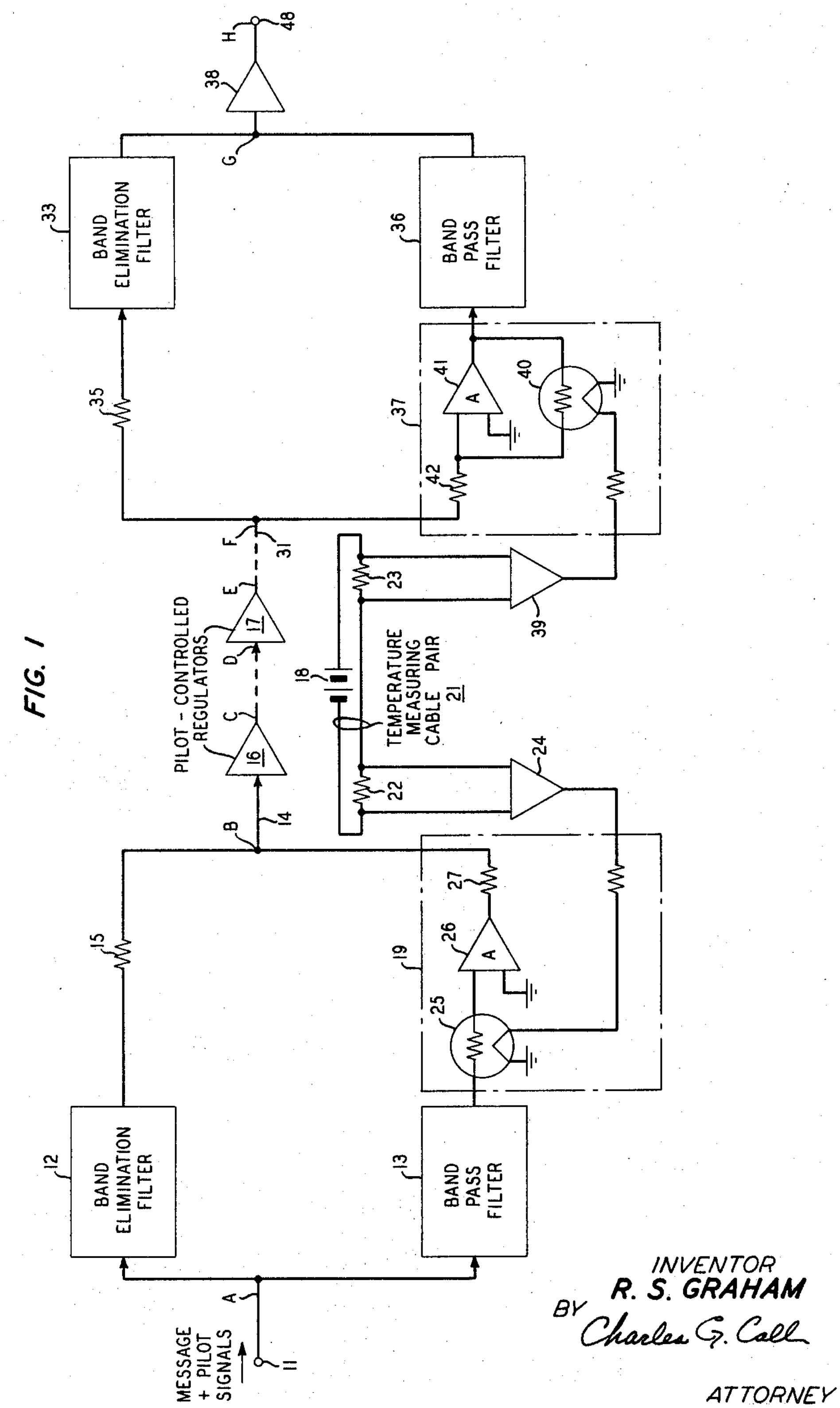

This invention relates to signal transmission systems and, more particularly, to regulating arrangements which compensate against changes in the loss characteristics of such systems.

The over-all loss (or gain) of a conventional transmission facility varies in response to temperature changes, aging of components, and a variety of other causes. It is a common practice to correct such deviations by means of "pilot-controlled regulators." Such regulators have a gain characteristic which is controlled by the amplitude level of a pilot signal which is transmitted over the facility along with the message signals. When the loss in that portion of the channel which feeds the regulator increases, the amplitude of the received pilot signal decreases. Responsive to this decrease in pilot signal level, the gain of the regulator increases to provide the desired correction. Because of their cimplicity and excellent operating capabilities, pilot-controlled regulators have found wide acceptance in the telephone plant.

Where a regulating device is provided at both the transmitting and the receiving end of a transmission path, compensation for loss deviations is best accomplished by providing equal gain corrections at the two regulators. In this situation, the transmitting-end regulator provides "pre-regulation" and the receiving-end regulator supplies "post-regulation." Through pre-regulation, the amplitude of the message signal arriving at the input to the receiving-end regulator is held at a more constant level as deviations in the loss characteristics of the channel occur. Pre-regulation thus permits a substantial improvement in the signal-to-noise ratio of the system. Unfortunately, the conventional pilot-controlled regulating arrangement provides only post-equalization; that is, each regulator is responsive only to loss deviations which are present in preceding sections of the channel.

It is accordingly an object of the present invention to obtain both post-regulation and pre-regulation through the use of conventional pilot-controlled regulators.

In a principal aspect, the present invention takes the form of transmission facility which includes at least two pilot-controlled regulators separated by a transmission path. A pilot signal and one or more message signals are applied to the transmitting end of the facility. In accordance with the invention, control apparatus is provided for varying the amplitude level of the pilot signal applied to the input of the transmitting-end regulator. According to a feature of the invention, this control apparatus is preferably adapted to vary the pilot signal level with respect to the message signal level by an amount equal to one half the loss deviation in the intermediate path. According to a further aspect of the invention, means may be provided for obtaining a measurement of the loss characteristics of the intermediate section. The control apparatus may then be adapted to readjust the input pilot signal level continuously or at intervals in response to changes in this measurement. The arrangement contemplated by the present invention is capable of providing the optimum amounts of both pre-regulation and post-regulation through the use of conventional pilot-controlled regulators.

Figure 2:
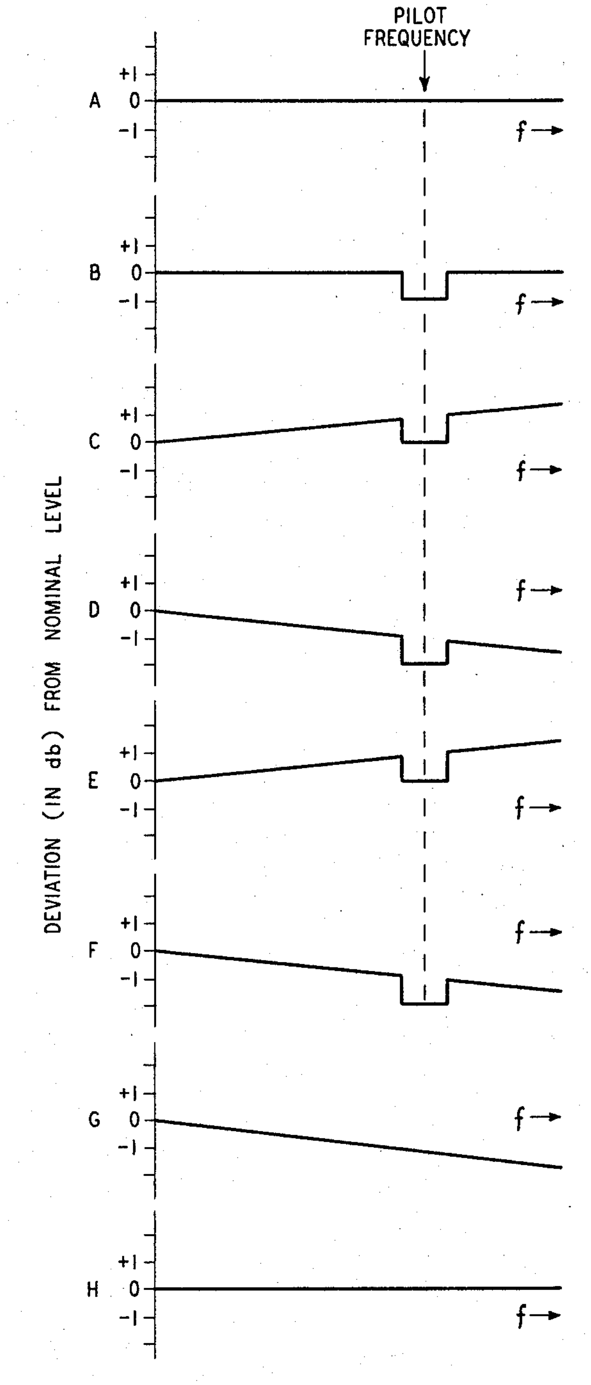

These and other features, objects and advantages of the invention may be more clearly understood by considering the following detailed description. In this description, reference will be made to the attached drawings in which:

FIG. 1 illustrates a pilot-controlled regulating system which embodies the principles of the invention; and FIG. 2 shows a series of loss-frequency characteristics which illustrate the operation of the arrangement shown schematically in FIG. 1.

The regulating arrangement shown in FIG. 1 of the drawings is adapted to provide both pre-regulation and post-regulation for a transmission channel employing pilot-controlled regulators. In accordance with the invention, pre-regulation is accomplished by altering the level of the pilot signal with respect to the message signal level at the transmitting end of the channel.

Both the message and pilot signals are applied to the terminal 11 as shown in FIG. 1 of the drawings. These signals may originate at a remote location and be carried to the terminal 11 over other transmission facilities. Terminal 11 is connected to the input of a band elimination filter 12 and to the input of a bandpass filter 13. The filter 12 blocks the passage of the pilot signal while filter 13 passes only the pilot signal. A fixed resistance 15 connects the output of band elimination filter 12 to the input 14 of a transmission channel which includes a transmitting-end regulator 16 and an intermediate regulator 17. The output of the bandpass filter 13 is connected to the input 14 by means of a first "offset" circuit 19, so named because it provides an over-all gain at the pilot frequency which is offset from the gain at the message frequencies.

Because of the action of filters 12 and 13, only the message signals pass through the resistance 15 while only the pilot signal passes through the offset circuit 19. Thus, by varying the gain of offset circuit 19, the level of the pilot signal may be varied with respect to the message signal level.

In the embodiment of the invention shown in FIG. 1 of the drawings, the input pilot signal level is altered in response to changes in cable temperature. As is well known, changes in cable temperature are a principal cause of loss deviations in a transmission system. Since these temperature-associated deviations may be predicted on the basis of laboratory measurements, the detection of a change in cable temperature provides an indication of a change in cable loss as well. Accordingly, in the embodiment of the invention as shown in FIG. 1, the gain of the offset circuit 19 is controlled by the resistance of a temperature-measuring cable pair 21 which may be included within the transmission cable sheath. Cable pair 21 is wired to bypass the regulators 16 and 17. Current measuring resistances 22 and 23 are connected in series with the cable pair 21. A battery 18 is connected across the cable pair 21 at one end of the transmission path and the pair is joined at the other end to form a current loop. An increase in cable temperature (indicating an increase in transmission loss) causes the resistance of the cable pair 21 to increase, which in turn causes a decrease in the voltages developed across resistances 22 and 23.

The voltage developed across resistance 22 is applied to the input of an amplifier 24 whose output is connected to the heater of a thermistor 25, thus heating the thermistor 25 in proportion to the voltage across resistance 22. The variable resistance portion of thermistor 25 is connected between filter 13 and the input of an amplifier 26. A resistance 27 connects the output of amplifier 26 to the channel input 14. Because the resistance of thermistor 25 increases as it is allowed to cool, offset circuit 19 causes the pilot signal level to be decreased with respect to the message signal level in response to the increase in cable temperature.

At the receiving end of the transmission system shown in FIG. 1, the pilot signal is restored to the message signal level before being applied to the receiving-end regulator 38. Signals on the incoming cable 31 are applied to a band elimination filter 33 through a fixed resistance 35 and to a bandpass filter 36 through a second offset circuit 37. The outputs of the two filters 33 and 36 are connected in common to the input of regulator 38.

The gain of offset circuit 37 is also controlled by the amount of current flowing in the temperature-measuring cable pair 21. The voltage developed across resistance 23 is applied to the input of an amplifier 39 which has its output connected to the heater of a thermistor 40. Thermistor 40 forms the negative feedback path for an inverting amplifier 41. A resistance 42 connects the input of amplifier 41 to the incoming cable 31. The output of amplifier 41 is connected to the input of bandpass filter 36. An increase in the resistance of cable pair 21 causes the heater current flowing to thermistor 40 to decrease. Thus, an increase in cable temperature causes a decrease in the amount of negative feedback through thermistor 40, hence increasing the pilot signal level with respect to the message signal level at the receiving end of the path.

Offset circuits 19 and 37 provide equal and opposite gain offsets at the pilot frequency. Both amplifier 26 (in offset circuit 19) and amplifier 41 (in offset circuit 37) have high-negative gains and produce an output voltage proportional to input current. The negative gain merely causes a net phase reversal of the pilot signal. The amount of current flowing to the input of amplifier 26 and accordingly the gain of offset circuit 19 are inversely proportional to the resistance of the thermistor 25. In offset circuit 37, the amplifier 41 has a very high input impedance. Thus, a current proportional to the input signal flows through both resistance 42 and thermistor 40. Because of the configuration used, the input to amplifier 41 is at essentially ground potential. The output voltage from amplifier 41 is hence equal to the product of the input current (determined solely by the input signal voltage and the value of resistance 42) and the thermistor resistance. Consequently, the gain of offset circuit 37 is directly proportional to the resistance of thermistor 40. Offset circuit 37 accordingly restores the pilot signal level to the message signal level regardless of the gain of offset circuit 19.

The manner in which pre-regulation is provided by the invention may be more clearly understood by considering the series of signal level deviation versus frequency characteristics which are depicted in FIG. 2, lines A through H, of the drawings. The same letter designation is employed both for the line in FIG. 2 which shows a given characteristic and the point on the transmission channel of FIG. 1 which gives rise to that characteristic. For example, at point D in FIG. 1, a signal level deviation of the type shown on line D of FIG. 2 may be observed.

FIG. 2 of the drawings depicts the deviations from a nominal signal level which would occur at various points in the arrangement of FIG. 1 if, because of an increase in cable temperature, the loss in the transmission channel increased. A condition has been chosen for purposes of illustrattion where the loss in each cable section has increased 2 db at the pilot frequency, the loss increase being proportional to frequency. That is, the pilot signal would be attenuated by 2 db more than the usual amount in passing from the output of regulator 16 (point C) to the input of regulator 17 (point D) and would also be attenuated by 2 db more than usual in passing from point E to point F.

Compensation for loss deviations in a section of the channel between two regulators is best accomplished by providing half the gain correction at the transmitting end and half at the receiving end. In a preferred scheme contemplated by this invention, loss deviation in a channel containing several pilot-controlled regulators are corrected by offsetting the transmitted pilot signal level with respect to the message signal level by an amount equal to half the loss deviation of each regulated section. Thus, to correct the 2 db per section loss increase, the magnitude of the pilot signal is decreased at the transmitting end by one decibel as shown by a comparison of FIG. 2, lines A and B. This is accomplished automatically by the action of offset circuit 19 whose gain is decreased in response to the increase in cable temperature.

The message signals and the attenuated pilot signal are then applied to the input of the transmitting-end, pilot-controlled regulator 16 as shown in FIG. 1. The regulator 16 returns the pilot signal to its nominal level. Because the input pilot signal level was intentionally reduced with respect to the message signal level, the message signals are amplified more than usual. In passing over the channel from the output of regulator 16 to the input of regulator 17, both the message signals and the pilot signal are attenuated. As mentioned earlier, the assumed additional loss caused by the increased in cable temperature is 2 db at the pilot frequency and the pilot is accordingly 2 db below its nominal level at point D. In returning the pilot signal to its nominal level, the regulator 17 also amplifies the message signals to an amplitude above the nominal level. Thus, it can be seen that offsetting the pilot level from the message signal level provides pre-regulation at each of the pilot-controlled regulators.

As previously discussed, the pilot signal is restored to the level of the message signals at the receiving end of the channel by the action of offset circuit 37. This may be seen from a comparison of lines F and G of FIG. 2. The message signals and the pilot signal being at the same level at the input to regulator 38, the entire frequency band is returned to its nominal level at the output terminal (point H).

Although the embodiment of the invention which has been described employs buried thermistors to control the magnitude of pilot signal level offset, it should be understood that a variety of other techniques may be employed. A measurement of loss deviation may be obtained by measuring the resistance of one or more thermistors buried with the cable, by means of an auxiliary pilot signal, or any one of several other well known loss measuring or predicting techniques. Additionally, the adjustment of pilot signal level need not be continuous but may be made at intervals following periodic loss measurements. These and many other modifications will be obvious to those skilled in the art and may be made without departing from the true spirit and scope of the invention.

What is claimed is:

1. In combination with a transmission channel which includes a plurality of pilot-controlled regulators, means for indicating a deviation in the transfer gain of said channel, a source of a pilot signal connected to the transmitting end of said channel, sensing means for indicating a deviation in the over-all attenuation of said channel, and means for decreasing the level of said pilot signal at the transmitting end of said channel in response to an indication of an increase in said attenuation by said sensing means.

2. In combination, a transmission channel having a transmitting end and a receiving end, a source of a pilot signal connected to said transmitting end, a source of a message signal connected to said transmitting end, a plurality of regulating amplifiers connected at intervals in said channel, the transfer gain of each of said amplifiers being controlled by the level of said pilot signal, sensing means for detecting deviations in the over-all attenuation between said transmitting and receiving ends of said channel, and means at said transmitting end responsive to said sensing means for varying the level of said pilot signal relative to the level of said message signal in response to the detection of a change in said over-all attenuation of said channel with said level of said pilot signal varying inversely with said over-all attenuation in said channel.

3. In combination, a transmission channel having a transmitting end and a receiving end, a source of a message signal connected to the transmitting end of said channel, a source of a pilot signal connected to the transmitting end of said channel, at least a first and a second pilot-controlled regulator connected at different points in said channel, means for detecting a deviation in the loss of that portion of said channel which separates said first and second regulators, and control means at said transmitting end for varying the level of said pilot signal with respect to the level of said message signal by an amount related to the magnitude of said deviation.

4. Apparatus as set forth in claim 3 wherein said control means comprises means for decreasing the level of said pilot signal with respect to the level of said message signal by an amount equal to one half of any increase in the loss of said portion of said channel.

5. In combination, a transmission path having a transmitting end and a receiving end, a source of a message signal and a pilot signal connected to said path at said transmitting end, at least two regulated amplifiers connected at different points in said path, means for controlling the gain of each one of said amplifiers in response to deviations in level of said pilot signal received at said one amplifier, sensing means for obtaining an indication of the transmission loss in at least a portion of said path, means at said transmitting end responsive to said sensing means for reducing the level of said pilot signal by an amount related to the magnitude of any increase in said loss indication, and means at said receiving end for restoring the level of said pilot signal to the level of said message signal.

References Cited

UNITED STATES PATENTS 2,350,951 6/1944 Zinn ---------------- 333—16

HERMAN KARL SAALBACH, *Primary Examiner.*

PAUL L. GENSLER, *Examiner.*